(12) United States Patent
Hong et al.

(10) Patent No.: US 6,314,066 B1
(45) Date of Patent: Nov. 6, 2001

(54) METHOD FOR CONTROLLING TRACK JUMP IN OPTICAL RECORDING MEDIUM

(75) Inventors: Seong Pyo Hong, Seoul; Sang On Park, Kyonggi-do; Hyung Jin Jeon, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/621,628

(22) Filed: Jul. 21, 2000

(30) Foreign Application Priority Data

Jul. 21, 1999 (KR) ................................................. 99-29573
Jul. 28, 1999 (KR) ................................................. 99-30890

(51) Int. Cl.[7] ....................................................... G11B 7/09
(52) U.S. Cl. .................................... 369/44.28; 369/44.26
(58) Field of Search ............................ 369/44.11, 44.26, 369/44.27, 44.28, 44.29, 44.32, 44.34, 44.35, 47.1, 53.1, 53.28, 53.37, 53.41, 275.1, 275.4

(56) References Cited

U.S. PATENT DOCUMENTS 4,866,688 * 9/1989 Ohtake et al. ................. 369/44.28 X
5,892,740 * 4/1999 Nagasawa et al. ................ 369/44.26
5,982,722 * 11/1999 Hasimoto .......................... 369/44.29

* cited by examiner

*Primary Examiner*—Muhammad Edun (57) ABSTRACT

Method for controlling track jump in an optical recording medium for writing/reading data on/from land/groove tracks having depths different from each other in a direction of a beam incident, including the steps of (1) adjusting an offset of a servo error signal generated by using an optical signal reflected at the optical recording medium consistent to the land track, (2) adjusting an offset of a servo error signal generated by using an optical signal reflected at the optical recording medium consistent to the groove track, (3) selecting the servo error signal having the offset adjusted consistent to the land/groove track in the step (1) or (2) in response to a land/groove switching signal, (4) receiving a track jump command, and determining the track jump command of being an 'N'('N' is an odd numeral) track jump command, and (5) if the track jump command is determined of being an 'N'('N' is an odd numeral) track jump command in the step (4), after switching the land/groove switching signal and carrying out an 'N' track jump, carrying out servo by using a servo error signal selected in response to the land/groove switching signal in the step (3).

16 Claims, 11 Drawing Sheets

METHOD FOR CONTROLLING TRACK JUMP IN OPTICAL RECORDING MEDIUM

BACKGROUND OF THE INVENTION

1. Field of the Invention

The present invention relates to a rewritable optical recording medium, and more particularly, to a method for controlling track jump in an optical recording medium having land and groove tracks with depths different from each other in a direction of a beam.

2. Background of the Related Art

In general, an optical recording medium system, i.e., an optical disk recording/reproducing device is a device for reading a data recorded on an optical disk, such as CD (Compact Disk) or DVD(Digital Versatile Disc), or writing the data on the optical disk. Of the rewritable optical disk in the optical disk, there are CD-RW(Rewritable Compact Disc), and Rewritable Digital Versatile Discs(DVD—RW, DVD-RAM, DVD+RW). Particularly, the DVD-RAM has signal tracks of lands and grooves, to write or read data to/from tracks, not only of lands or grooves, but also tracks both of lands and grooves.

Figure 1:
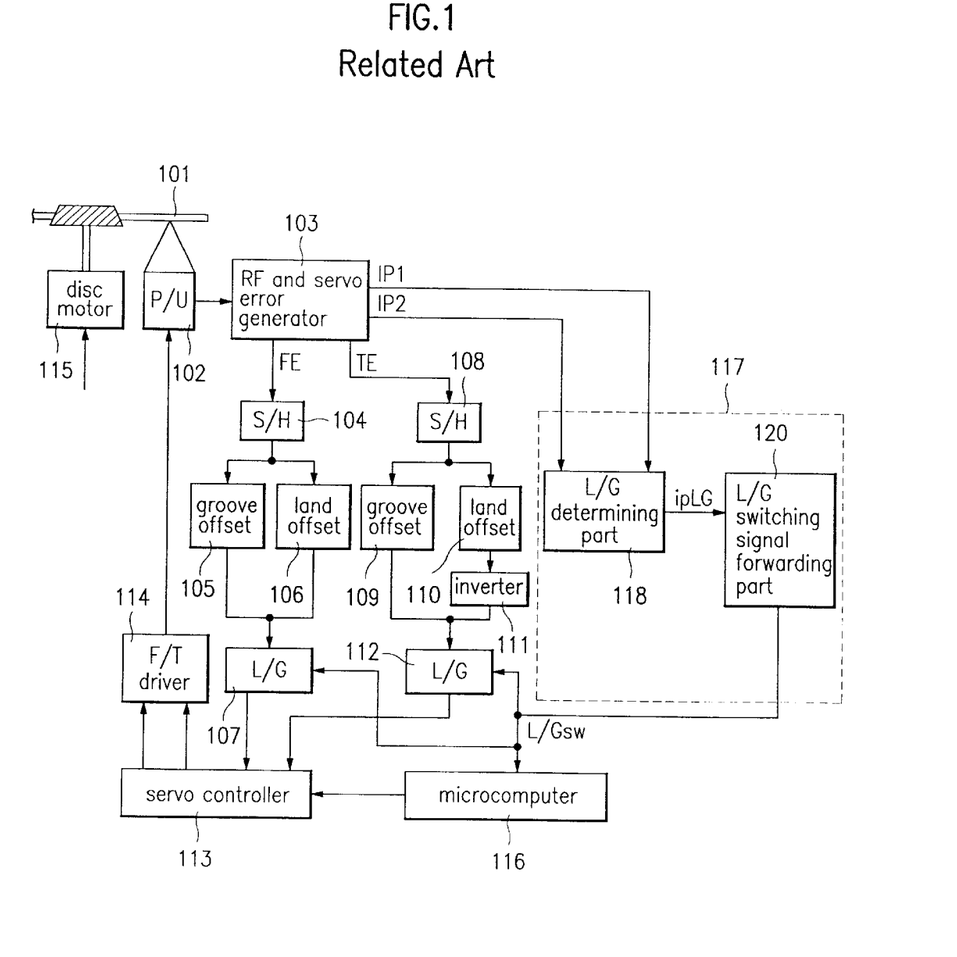
FIG. 1 illustrates a block diagram of a related art device for recording/reproducing a data on/from a rewritable optical disk.
Figure 2:
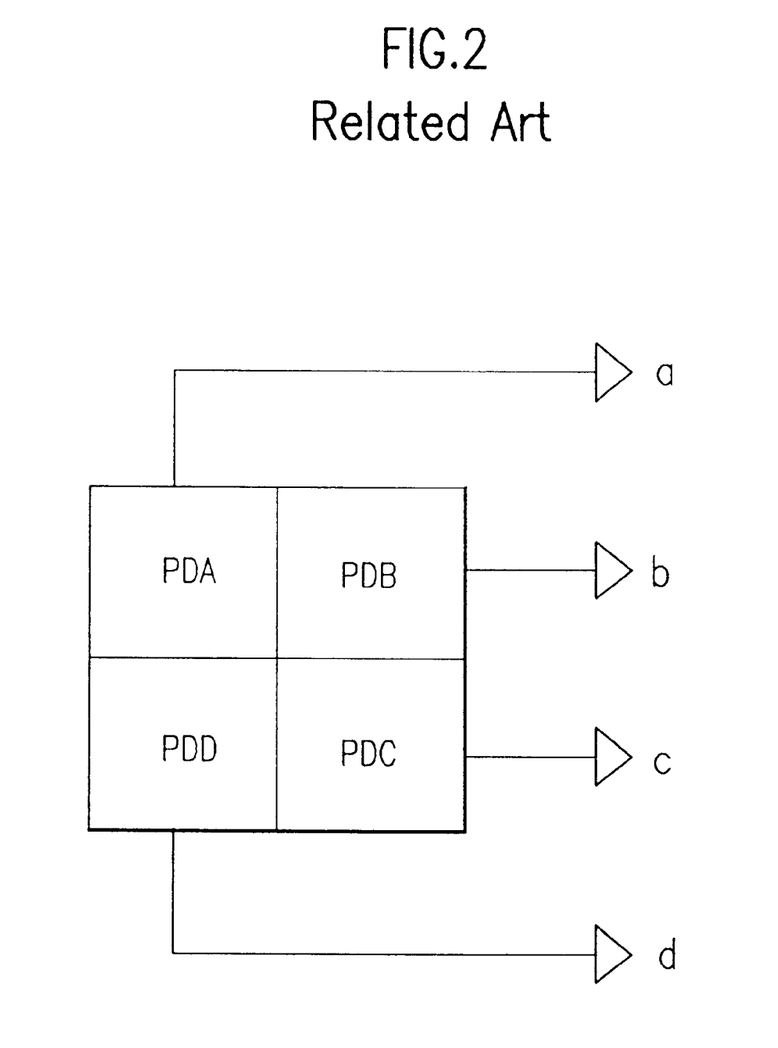
FIG. 2 illustrates a configuration of a header preformatted at beginning of each sector in the rewritable disk in FIG. 1.
Figure 3:
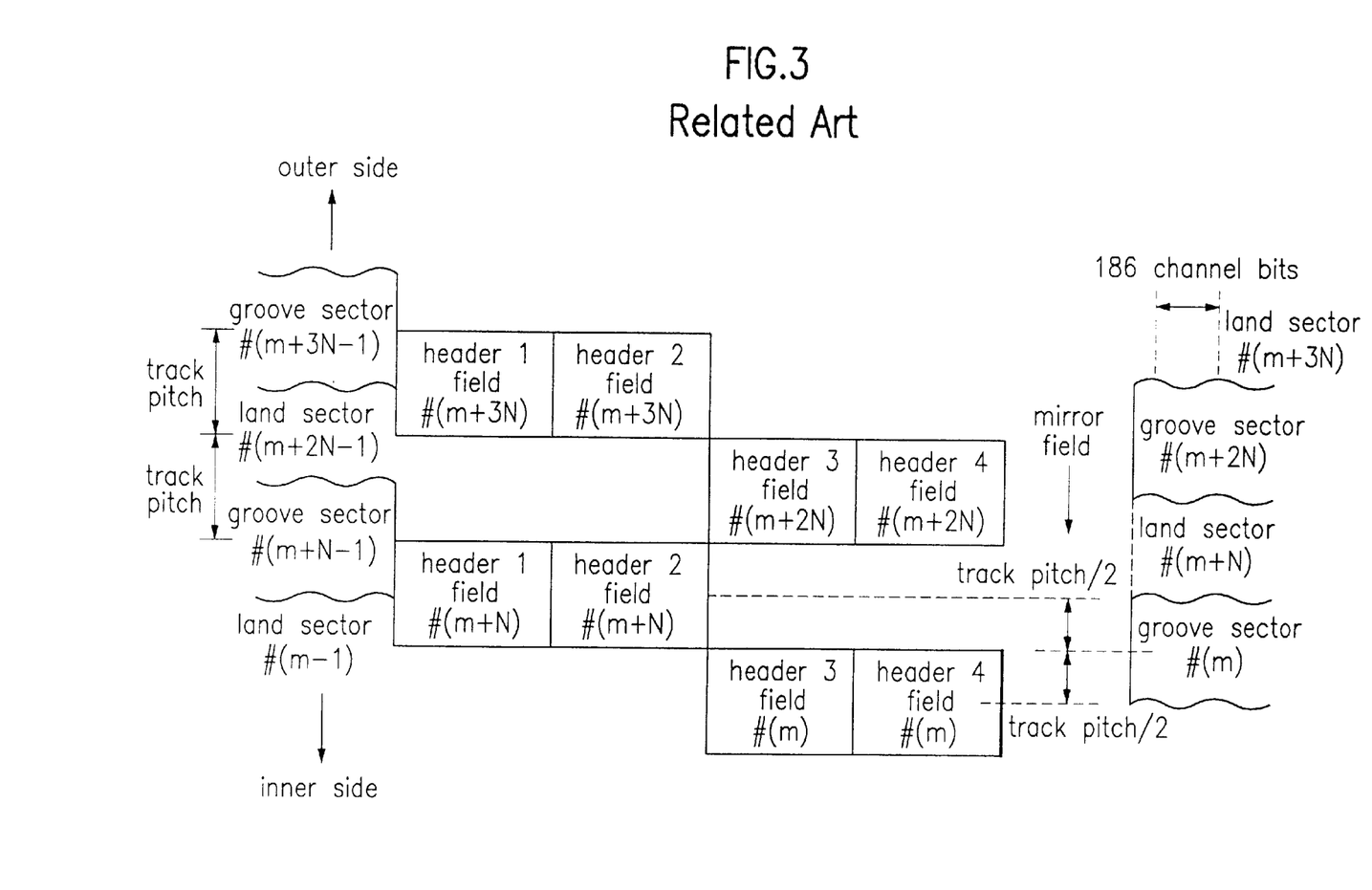
FIG. 3 illustrates one example of the optical detector in FIG. 1.

FIG. 1 illustrates a block diagram of a related art recording/reproducing device such a DVD-RAM, wherein, under the control of the servo controller 113, an optical pickup 102 directs a beam focused by an objective lens onto the signal track of the optical disk 101, or directs a beam, reflected at a signal recording surface and focused again by the objective lens, toward an optical detector for detecting a focus error signal and a tracking error signal. The optical detector has a plurality of optical detecting elements each for forwarding an electric signal proportional to an optical quantity of light incident thereto to a RF and servo error generator 103. As shown in FIG. 2, if the optical detector has a particular number of divisions, i.e., four divisions in a signal track direction and in a radial direction of the optical disk 101, four optical detecting elements PDA, PDB, PDC, and PDD, the optical detector forwards electrical signals 'a', 'b', 'c', and 'd' proportional to quantities of lights obtained at respective optical detecting elements PDA, PDB, PDC, and PDD to the RF and servo error generator 103. The RF and servo error generator 103 combines the electrical signals 'a', 'b', 'c', and 'd', to produce a RF signal (or a read channel 1 signal) required for data reproduction, a read channel 2 signal required for servo control, and a focus error signal. The RF signal can be obtained by (a+b+c+d) of the electrical signals from the optical detector, the read channel 2 signal can be obtained by (a+d)−(b+c) of the electrical signals from the optical detector, and the tracking error TE signal can be obtained by processing the read channel 2 signal. If the optical detector has two division in the track direction, the RF signal (=I1+I2) and the read channel 2 signal (=I1-I2) can be detected from balances of quantities of lights. That is, 'a'+'d' in FIG. 2 corresponds to I1, and 'b'+'c' corresponds to I2. In this instance, in a case of a rewritable disk 101, it is impossible to control and write on the disk because the disk has no information. For this, by forming disk tracks on the lands and the grooves, writing information along the tracks, and writing control information on sector addresses, random accesses, and rotation control separately, the tracking control can be made even for an empty disk having no information signal recorded thereon. The control information may be written by pre-formatting a header region at beginning of every sector. In a case of the DVD-RAM, the head region pre-formatted at beginning of every sector is provided with four header fields(a header 1 field~header 4 field) again. The header 1, and 2 fields and the header 3 and 4 fields are formed to alternate with reference to a track center, one example of which is illustrated in FIG. 3 wherein a configuration of a header field for the first sector of one track is shown.

However, the header configuration affects generation of servo error signals, such as the tracking error signal, focus error signal actually. That is, the servo error signal read from the header region is distorted by the header configuration, control of which is difficult. Therefore, in the case of the DVD-RAM, in order to generate the servo signal and to make a stable control of it, the servo is controlled by holding respective error signals, for example, the tracking error TE signal and the focus error FE signal for reducing an influence from the header. That is, a focus sample & hold part 104 samples and holds the focus error FE signal and the tracking error TE signal at positions right forward of the header region. This is because, though the focus servo and the tracking servo operations are carried out even in the header, the servo operations are carried out, not by the tracking error signal and the focus error signal detected in the header region, but by the tracking error signal and the focus error signal held at the positions right forward of the header region. In this instance, the header region may be detected by different methods including known arts.

In the meantime, the tracking error signal on the land is an inversion of the tracking error signal in the groove. That is, since the tracking error signal detected from the land has a phase inverted from a phase of the tracking error signal detected from the groove, the phases of the tracking error signals both from the land and the groove should be made the same for making regular tracking on the land and groove. And, there is a difference of DC offsets the land and the groove basically have (i.e., a difference of amounts in terms of signals coming from a depth difference of the land and the groove). That is, even if the focusing and the tracking are right on the land track, if the focusing and the tracking are applied to the groove track as they are, a defocusing and a detracking may occur, and, opposite to this, even if the focusing and the tracking are right in the groove track, if the focusing and the tracking are applied to the land track as they are, the defocusing and the detracking may occur due to a difference of depth between the land and the groove. Therefore, an additional circuit for this is required, such as a focus groove offset part 105, a focus land offset part 106, a tacking groove offset part 109, and a tracking land offset part 110. The focus groove offset part 105 and the focus land offset part 106 adjust focus error offsets of the groove/land respectively for carrying out a regular focus servo. And, the tacking groove offset part 109, the tracking land offset part 110, and the invertor 111 adjust tracking errors for the groove/land respectively and inverts the tracking error signal detected from the land for carrying out regular tracking servo.

In this instance, L/G selecting part 107 or 112 selects the focus error signal and the inverted tracking error signal having offsets adjusted respectively to be consistent to the land at the land offset part 106 or 110 in response to an L/G switching signal L/Gsw, i.e., if the present signal track represents the land, or, the L/G selecting part 107 or 112 selects the focus error signal and the tracking error signal having offsets adjusted respectively to be consistent to the groove at the groove offset part 105 or 109 in response to an L/G switching signal L/Gsw, i.e., if the present signal track represents the groove, and forwards the selected focus error signal and the tracking error signal to the servo controller 113. Accordingly, the servo controller 113 conducts the focus servo and the tracking servo either by using the focus error signal and the tracking error signal having offsets adjusted respectively to be consistent with the land through an F/T(Focus/Track) servo driver 114, or by using the focus error signal and the tracking error signal having offsets adjusted respectively to be consistent with the groove through an F/T(Focus/Track) servo driver 114, in response to the L/G switching signal L/Gsw. The L/G denotes a switching from the land signal track to the groove signal track or vice versa.

Such an L/G switching signal L/Gsw is generated at the L/G switching signal generator 117. The L/G switching signal generator 117 is provided with L/G determining part 118 for determining the land and the groove by using IP1 and IP2 signals detected from the read channel 2 signal, and an L/G switching signal forwarding part 119 for inverting the L/G switching signal L/Gsw according to the L/G determination result.

Figure 4:
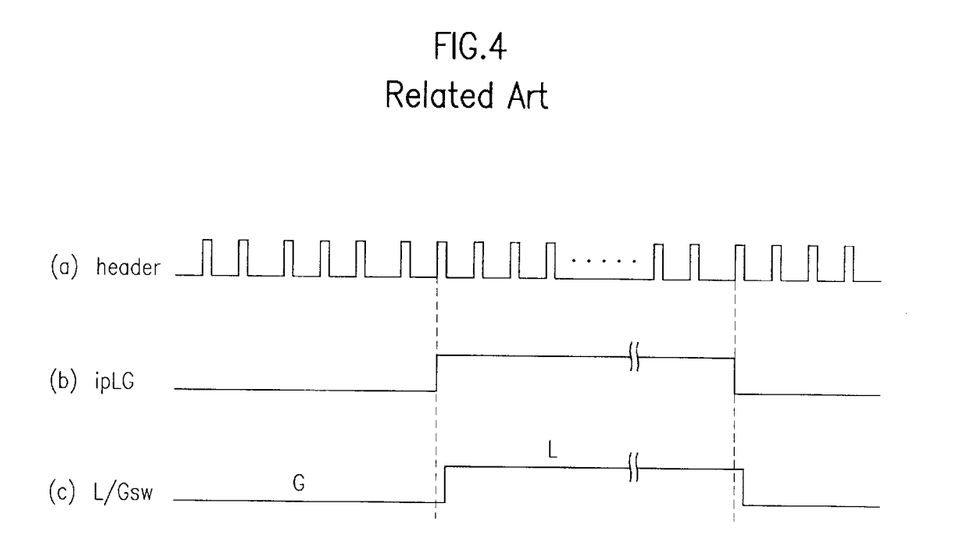
FIGS. 4A~4C illustrate timing diagrams showing relations of a header, an ipLG, and L/Gsw signals for land/groove switching in a regular tracking.

FIGS. 4A~4C illustrate waveforms showing a process of generating the L/G switching signal L/Gsw of L/G switching in a regular servo, i.e., in regular writing/reading. That is, the read channel 2 signals detected in the header 1, 2 fields and the header 3, 4 fields have opposite phases (i.e., slopes) because the header region, i.e., the header 1, 2 fields and the header 3, 4 fields are arranged to alternate with reference to a track center. Therefore, if the read channel 2 signal is sliced at a preset slice level, the IP1 and the IP2 can be detected. For example, if it is assumed that the slice level is set to the track center, and the IP1 signal is generated if the read channel 2 signal is higher than the slice level, and the IP2 signal is generated if the read channel 2 signal is lower than the slice level, phases of the IP1 signal and the IP2 signal will be changed depending on the track tracking at the present time of being the land or the groove. Dependent on the land/groove track, either the IP1 signal or the IP2 signal comes the first. Therefore, as shown in FIG. 4A, the L/G determining part 118 determines a front and a rear of the IP1 and IP2 signals detected at every header position, to invert ipLG signal as shown in FIG. 4B, and the L/G switching signal forwarding part 119 inverts the L/G switching signal L/Gsw as shown in FIG. 4C and forwards to a microcomputer 116 and the L/G selecting parts 107 and 112 if the ipLG signal is switched. That is, the L/G determining part 118 determines the optical pickup 102 of tracking the land track or the groove track with reference to the IP1 and IP2 signals, and forwards a relevant signal ipLG, and the L/G switching signal forwarding part 119 forwards a signal L/Gsw for controlling the optical pickup 102 to track the land track or the groove track.

Figure 5:
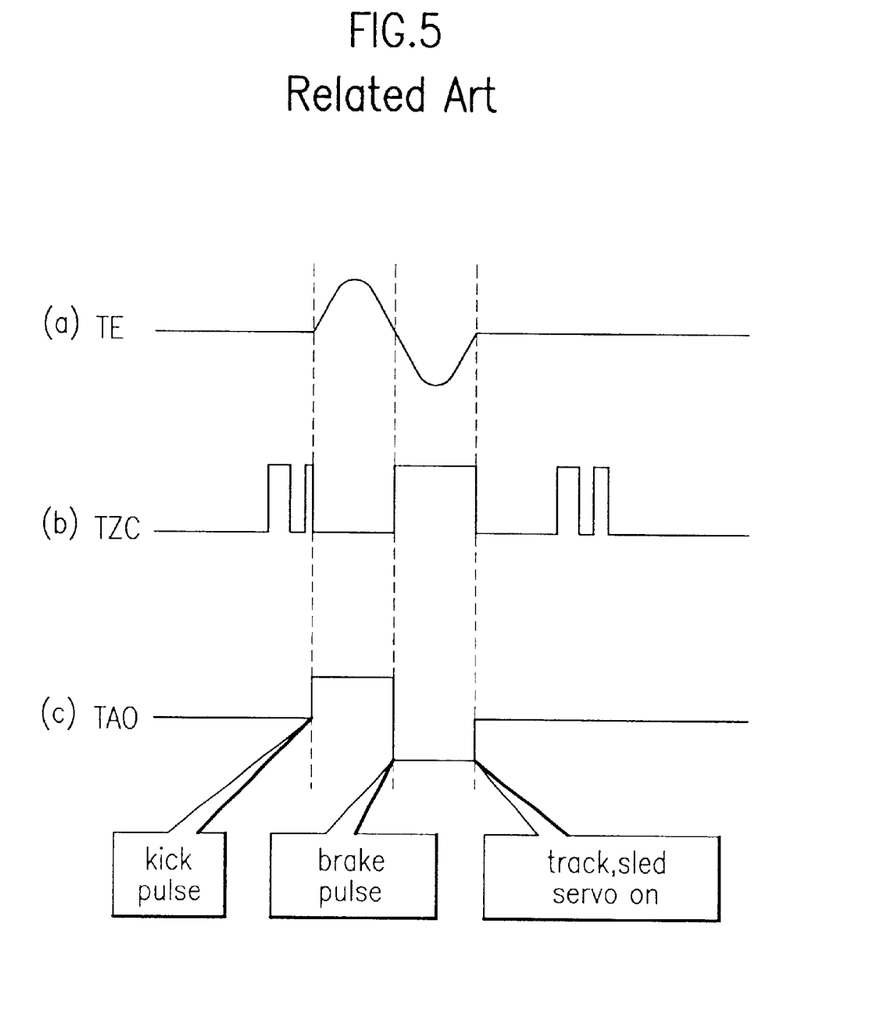
FIGS. 5A~5C illustrate timing diagrams showing a related art one track jump process.

The description until now is on regular servo, i.e., regular writing/reading in an L/G structured DVD-RAM. If the foregoing method is applied to a track jump in the DVD-RAM, there can be a problem. That is, in a case of the L/G structured DVD-RAM, if odd numbers of track jumps inclusive of one track jump, for example, track jumps of land→groove, or groove→land are done, a land and groove inversion is occurred, to require the L/G switching. However, in the track jump, detection of the read channel 2 signal is poor because the turned off tracking servo causes the servo unstable, that results in poor detection of the IP1 and IP2 signals too, to fail proper generation of the ipLG signal. The improper ipLG signal may switch the L/G switching signal LGsw at a section which is not a L/G switching time point. And, if the offset is not exact due to this, a defocus or detrack may occur, in which the focus or the tracking servo does not follow a desired track. And, if no L/G switching is made in the odd number track jump, with the L/G signal having a previous value as it was, the defocus, or the detrack is occurred, in which the tracking servo does not follow a desired track, but to a track at a side of the desired track because the offsets are not exact. That is, in a jump of land→groove track, the focusing, and tracking may follow, not a groove track, but a land track, and, opposite to this, in a jump of groove→land track, the focusing and tracking may follow, not a land track, but a groove track. Particularly, if the foregoing related art is used in one track jump in an optical disk, such as the DVD-RAM data writing/reading both on/in land/groove of which is permitted as it is, there is a possibility of occurrence of two track jump. That is, provided that one track jump command is given, the servo controller 113 generates a kick pulse (or a jump pulse) in a state only the focus servo is turned on, and provides a track driving voltage TAO proportional to the kick pulse to a tracking actuator through an F/T servo driver 114 as shown in FIG. 5C. When the track driving voltage TAO proportional to the kick pulse is provided, an object lens of the tracking actuator is pushed in a direction of track jump by an acceleration as a speed of the tracking actuator is increased. In this instance, the tracking error signal makes an 'S' curve as shown in FIG. 5A. And, as shown in FIG. 5B, a TZC(Track Zero Crossing) signal turned on/off at a zero cross time point of the tracking error signal TE rises at a zero cross position of the tracking error signal. When the TZC signal rises, the servo controller 113 applies brake pulses to the actuator for a preset brake time period, to drop a speed of the actuator. That is, the tracking actuator is accelerated by the kick pulse until the brake pulse is generated when the tracking actuator is decelerated. Being inverted pulses of the kick pulses, the brake pulses are generated for stable and exact stopping of the actuator at a desired position. And, at an end of the preset brake time period, the tracking servo and a sled servo are turned on, to complete the track jump.

In a case when the optical disk 101 is a disk data can be written either on a track or in a groove thereof, such as CD-ROM, DVD-ROM, if the track jump is done by the foregoing process, one track jump is made. However, if the optical disk 101 is a disk data can be written/read both on the land and in the groove, for example, the DVD-RAM, if the track jump is done by the foregoing process, two track jump is made. That is, not one track jump of groove→land, or land→groove, but two track jump of groove→groove, or land→land is made.

SUMMARY OF THE INVENTION

Accordingly, the present invention is directed to a method for controlling track jump in an optical recording medium that substantially obviates one or more of the problems due to limitations and disadvantages of the related art.

An object of the present invention is to provide a method for controlling track jump in an optical recording medium, which carries out a track jump after an L/G switching signal is switched if an odd number track jump command is received.

Other object of the present invention is to provide a method for controlling track jump in an optical recording medium, which switches an L/G switching signal, and carries out a track jump after an L/G switching section is passed if an odd number track jump command is received in the vicinity of the L/G switching section.

Another object of the present invention is to provide a method for controlling track jump, which permits one track jump even on an optical disk data writing/reading both on a land and in a groove thereof is permitted.

Further object of the present invention is to provide a method for controlling track jump, in which a tracking error signal is differentiated if one track jump command is received, and a tracking zero cross signal produced from the differentiated tracking error signal is used as a control signal for the one track jump.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for controlling track jump in an optical recording medium for writing/reading data on/from land/groove tracks having depths different from each other in a direction of a beam incident, includes the steps of (1) adjusting an offset of a servo error signal generated by using an optical signal reflected at the optical recording medium consistent to the land track, (2) adjusting an offset of a servo error signal generated by using an optical signal reflected at the optical recording medium consistent to the groove track, (3) selecting the servo error signal having the offset adjusted consistent to the land/groove track in the step (1) or (2) in response to a land/groove switching signal, (4) receiving a track jump command, and determining the track jump command of being an 'N'('N' is an odd numeral) track jump command, and (5) if the track jump command is determined of being an 'N'('N' is an odd numeral) track jump command in the step (4), after switching the land/groove switching signal and carrying out an 'N' track jump, carrying out servo by using a servo error signal selected in response to the land/groove switching signal in the step (3).

When the 'N'('N' is an odd numeral) track jump command is received in the vicinity of a land/groove switching section, switching of the land/groove is waited, and if switching of the land/groove switching signal is made by the land/groove switching, the 'N' track jump is carried out after the land/groove switching signal is switched again.

In another aspect of the present invention, there is provided a method for controlling track jump in an optical recording medium for writing/reading data on/from land/groove tracks having depths different from each other in a direction of a beam incident, including the steps of (1) adjusting an offset of a servo error signal generated by using an optical signal reflected at the optical recording medium consistent to the land track, (2) adjusting an offset of a servo error signal generated by using an optical signal reflected at the optical recording medium consistent to the groove track, (3) selecting the servo error signal having the offset adjusted consistent to the land/groove track in the step (1) or (2) in response to a land/groove switching signal, (4) receiving a track jump command, and determining the track jump command of being an 'N'('N' is an odd numeral) track jump command, (5) if the track jump command is determined of being an 'N'('N' is an odd numeral) track jump command in the step (4), determining that whether the 'N' track jump command is generated in the vicinity of the land/groove switching section or not, (6) if it is determined that the 'N' track jump command is not generated in the vicinity of the land/groove switching section in the step (5), switching the land/groove switching signal, carrying out the 'N' track jump, and operating a servo in response to the servo error signal selected according to the land/groove switching signal in the step (3), and (7) if it is determined that the 'N' track jump command is generated in the vicinity of the land/groove switching section in the step (5), waiting for the lang/groove switching, and, once the land/groove switching signal is switched by the land/groove switching, switching the land/groove switching signal again, carrying out the 'N' track jump, and operating a servo in response to the servo error signal selected according to the switched land/groove switching signal.

In other aspect of the present invention, there is provided a method for controlling track jump in an optical recording medium for writing/reading data on/from land/groove tracks having depths different from each other in a direction of a beam incident, including the steps of (1) adjusting an offset of a servo error signal generated by using an optical signal reflected at the optical recording medium consistent to the land track, (2) adjusting an offset of a servo error signal generated by using an optical signal reflected at the optical recording medium consistent to the groove track, (3) upon reception of a track jump command, determining the track jump command of being one track jump command, (4) if it is determined in the step (3) that the track jump command is one track jump command, differentiating a tracking error signal generated in this instance, and detecting a tracking zero cross signal from the differentiated tracking error signal, (5) carrying out one track jump by using the tracking zero cross signal detected from the differentiated tracking error signal as a reference of a brake pulse generating time point, and (6) once the one track jump is carried out in the step (5), operating a servo in response to the servo error signal having an offset adjusted to be consistent to a land track or the servo error signal having an offset adjusted to be consistent to a groove track in response to the land/groove switching signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 6:
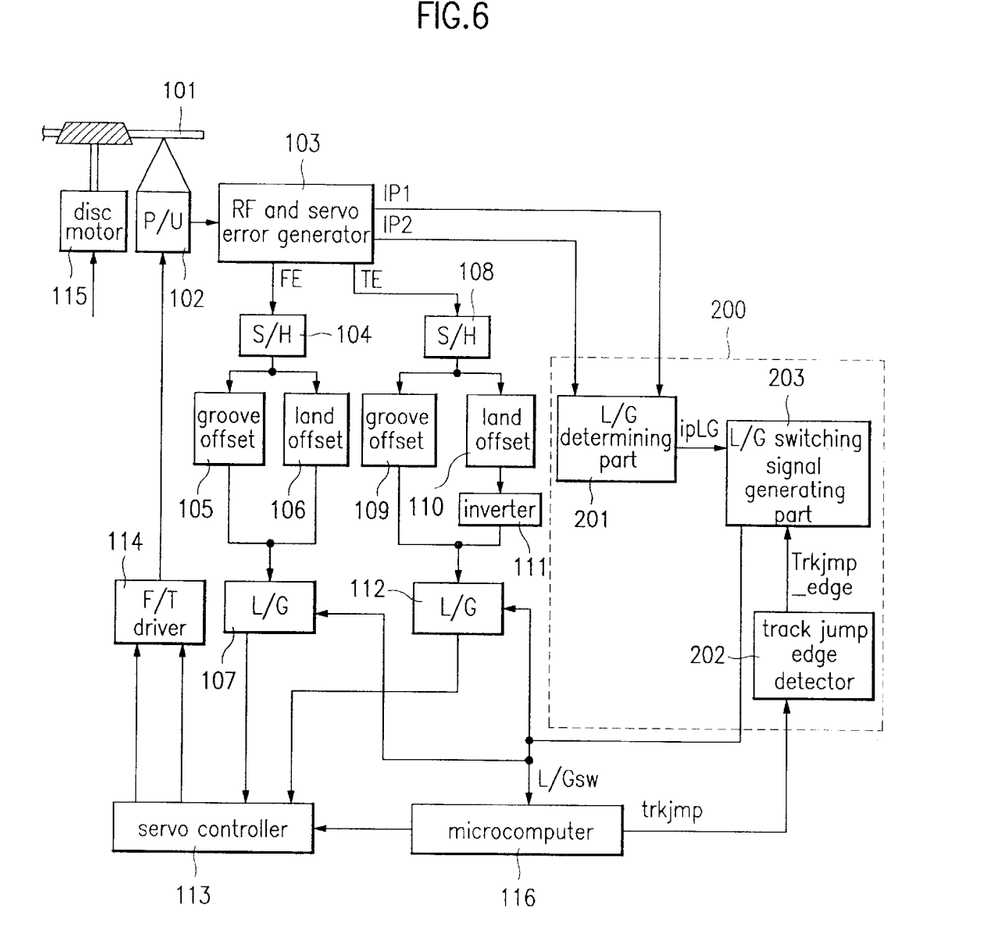
FIG. 6 illustrates a block diagram of a device for recording/reproducing a data on/from a rewritable optical disk in accordance with a preferred embodiment of the present invention.

Reference will now be made in detail to the preferred embodiments of the present invention, examples of which are illustrated in the accompanying drawings. FIG. 6 illustrates a block diagram of a device for recording/reproducing a data on/from a rewritable optical disk in accordance with a preferred embodiment of the present invention, of which L/G switching signal generator 200 and microcomputer 116 only are different from the system shown in FIG. 1. That is, the L/G switching signal generator 200 includes an L/G determining part 201 for determining a land and a groove by using IP1 and IP2 signals detected from a read channel 2 signal, a track jump edge detector 202 for detecting an edge of a track jump signal trkjmp received from the microcomputer 116, and an L/G switching signal forwarding part 203 for forced switching of the L/G switching signal upon detection of the edge of the track jump signal.

Figure 7:
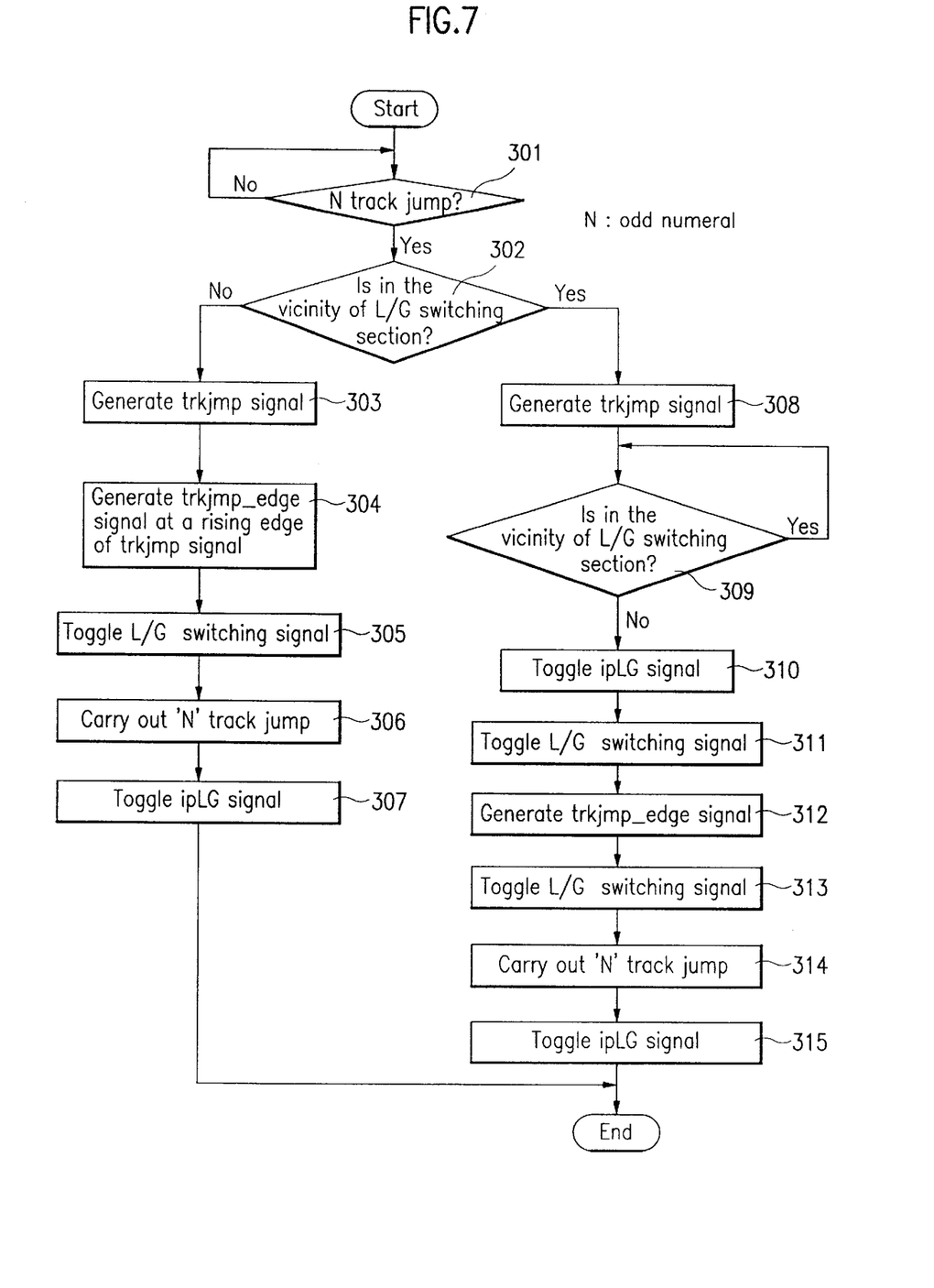
FIG. 7 illustrates a flow chart showing a method for controlling a track jump in accordance with a preferred embodiment of the present invention.
Figure 8:
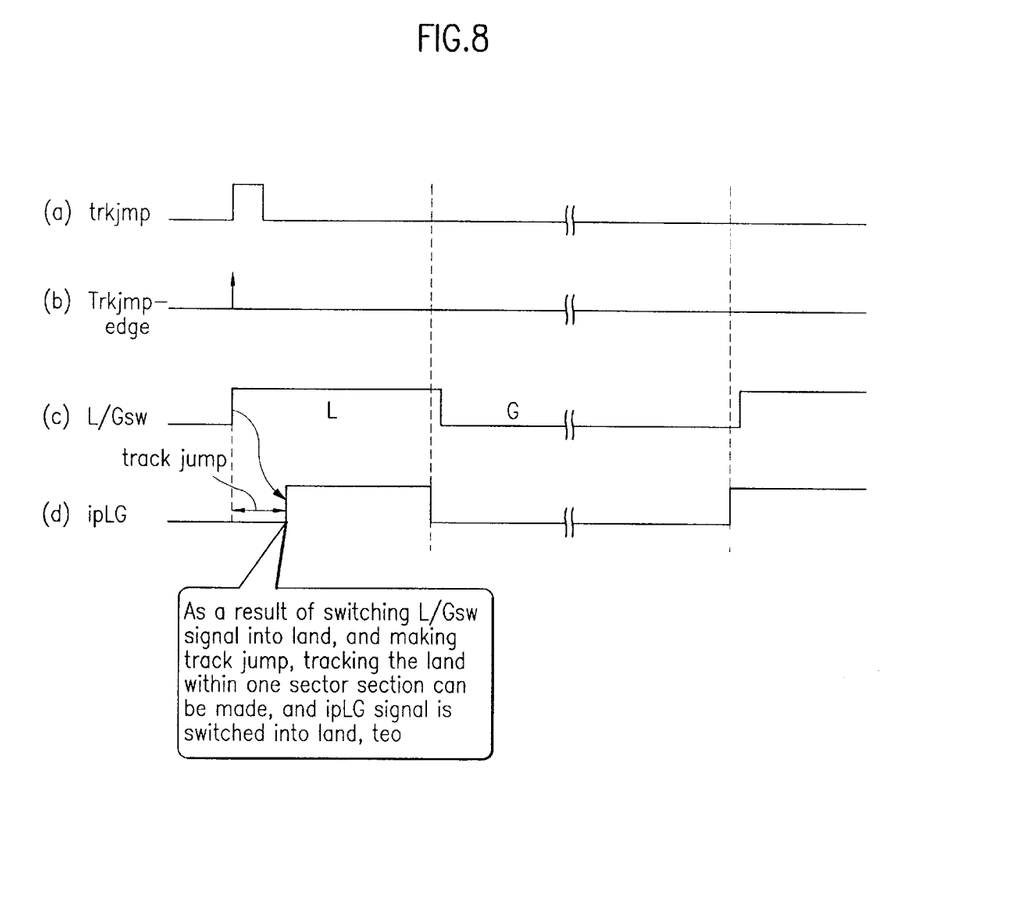
FIGS. 8A~8D illustrate timing diagrams showing relations of trkjmp, trkkmp_edge, ipLG, and L/Gsw signals for land/groove switching in an N(N is an odd number) track jump in FIG. 6.

FIG. 7 illustrates a flow chart showing a method for controlling a track jump in accordance with a preferred embodiment of the present invention. In the present invention, if N is an odd numeral in making an N track jump, the L/G switching signal is switched forcibly, and if N is even numeral, a previous value is maintained as it was. That is, if N is an odd numeral, a track jump of land→groove, or groove→land track is made, L/G switching is required. Therefore, upon reception of the track jump command, the microcomputer 116 identifies a number of tracks to be jumped, i.e., the 'N', and determines the 'N' of being an odd numeral. (step 301). If the number of tracks to be jumped is an odd numeral, it is determined that the track jump command is occurred in the vicinity of the L/G switching section. (step 302). If it is determined in the step 302 that the track jump command is not occurred in the vicinity of the L/G switching section, as shown in FIG. 8A, a trkjmp signal is provided to the track jump edge detector 202 for an L/G switching. (step 303). Upon reception of the trkjmp signal, the track jump edge detector 202 detects a rising edge of the trkjmp signal, and generates a trkjmp_edge signal at the rising edge for one clock as shown in FIG. 8. (step 304). In the present invention, for the sake of convenience of explanation, it is assumed that the track jump is made from a groove track to a land track. The opposite case is applicable in the same fashion. In this instance, when the trkjmp_ edge signal is generated, the L/G switching signal generator 203 inverts the L/G switching signal L/Gsw at the moment right away as shown in FIG. 8C. (step 305). FIG. 8C illustrates a state in which the L/G switching signal L/Gsw is switched from a groove to a land when the trkjmp_edge signal is generated. Accordingly, the L/G selecting part 107 or 112 selects a focus error signal and an inverted tracking error signal having an offset adjusted consistent to the land track at the land offset part 106 or 110 and the invertor 111 under the control of the toggled L/G switching signal L/Gsw. However, the optical pickup 102 is not switched from the groove to the land yet, the L/G determining part 201 determines the present signal track being a groove track according to determination of an order of the IP1 and IP2 signals. Therefore, the ipLG signal is maintained in a state the same as before as shown in FIG. 8D.

And, as shown in FIG. 8C, if the L/G switching signal L/Gsw is inverted from groove to land, the servo controller 113 executes an N track jump (step 306) under the control of the microcomputer 116 on the same time, during which only the focus servo is turned on and the tracking servo is turned off. Then, upon completion of the N track jump, the tracking servo is turned on. In this instance, the focus, and tracking servos are turned on exactly on the lane track because the focus error signal and the tracking error signal having offsets already adjusted consistent to the land track through the L/G selecting part 107 or 112 are provided. And, when the track jump is made, since a position of the optical pickup is switched from the groove track to the land track, phases of the IP1 and IP2 signals are switched and the L/G determining part 201 inverts the ipLG signal as shown in FIG. 8D. (step 307). For example, in a case of one track jump, if the L/G switching signal L/Gsw is forcibly inverted by the L/G switching signal generator 203 and the optical pickup 102 moves by one track, the tracking servo follows the next track within one sector section time period. Then, the L/G determining part 201 also determines that L/G switched at the next header location, the L/G determining part 201 inverts the ipLG signal. As results of switching of the L/G switching signal from groove to land and the track jump, the tracking is switched to the land within one sector section, and the ipLG signal is also switched to land.

Figure 10:
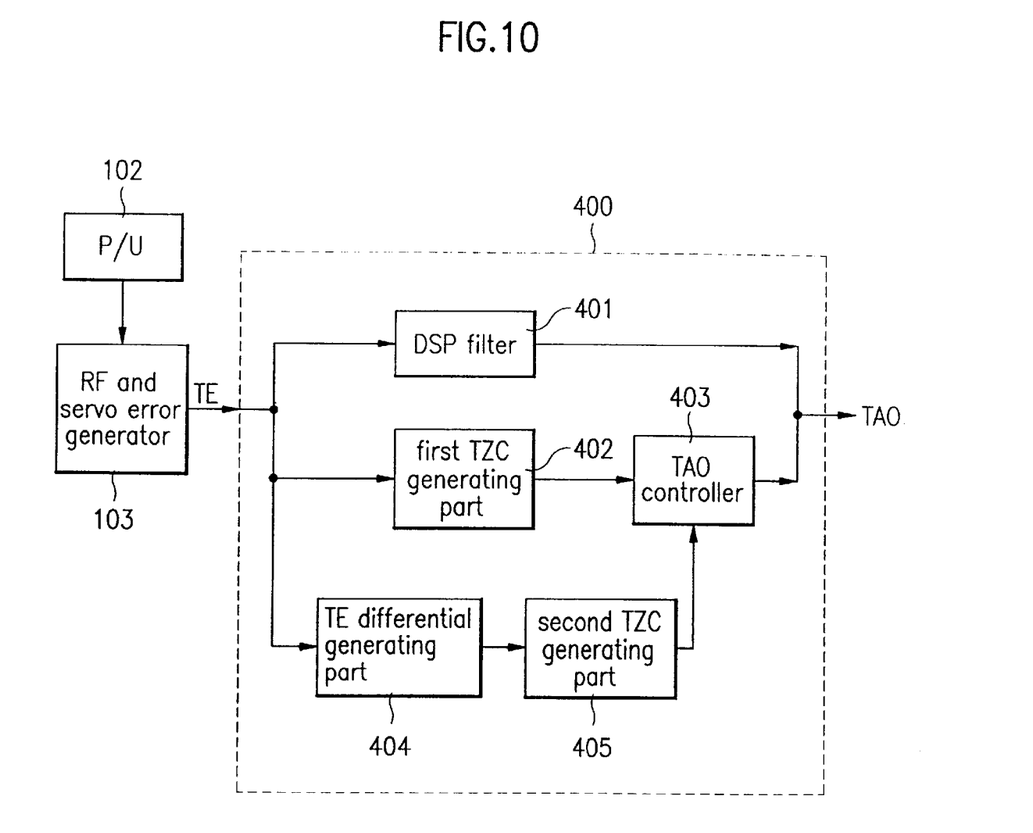
FIG. 10 illustrates a block diagram showing a method for controlling a one track jump in accordance with another preferred embodiment of the present invention; and, FIGS. 11A~11F illustrate timing diagrams showing the one track jump process in FIG. 10.
Figure 11:
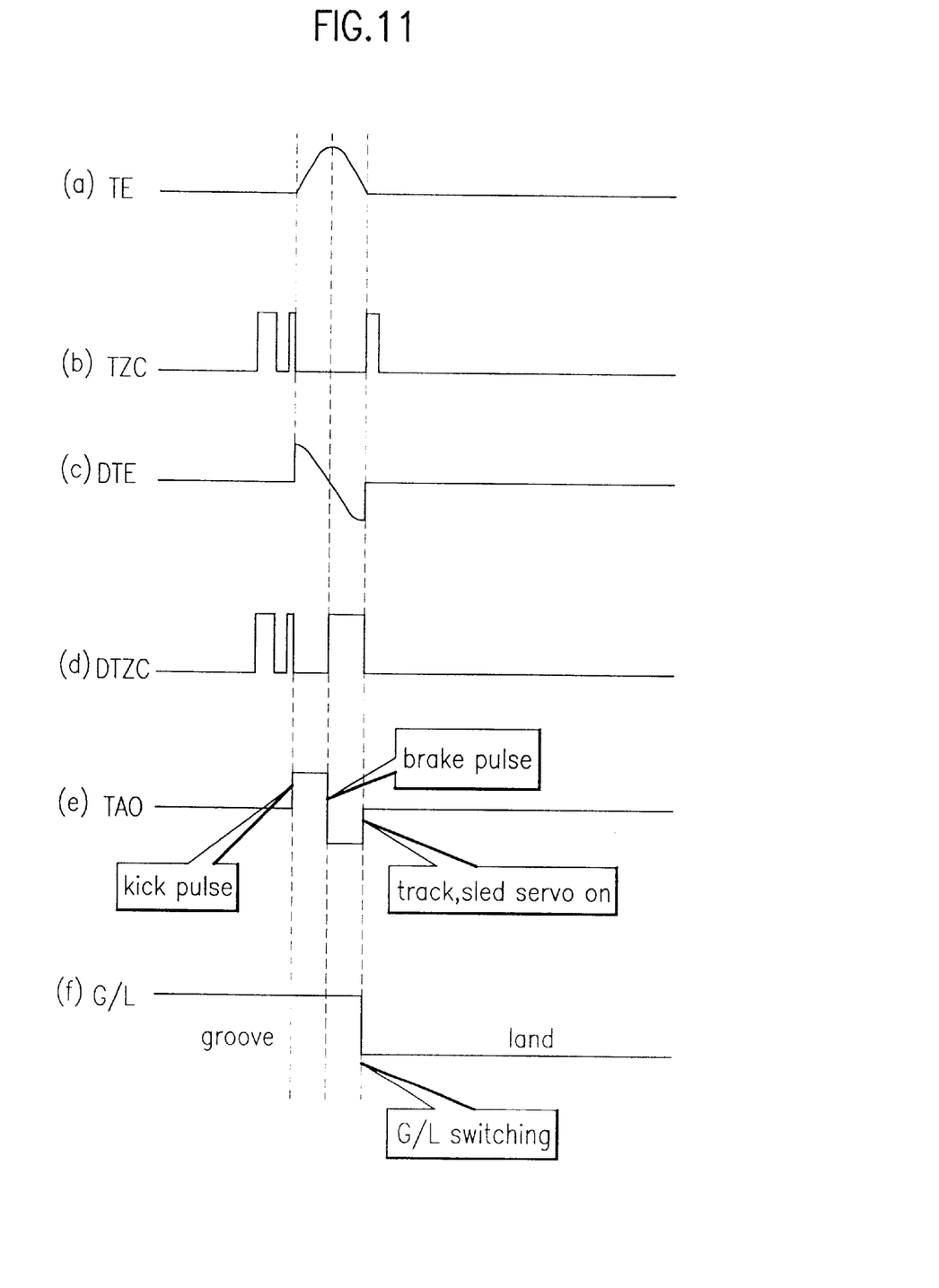

In the meantime, in the case of one track jump, other method may be applicable. FIG. 10 illustrates a block diagram showing one embodiment, particularly, illustrates a block diagram showing a system of a servo controller related to the track jump in the device for recording/reproducing a data on/from an optical disk. That is, upon reception of the one track jump command, after differentiating the tracking error signal, and generating a TZC signal from the differentiated tracking error signal, by starting braking operation at or after a rising time point of the TZC signal, and by turning on the tracking servo and the sled servo after switching L/G at or after the rising time point of the TZC signal detected from the tracking error signal before being differentiated, the one track jump can be made.

Referring to FIG. 10, the servo controller includes a track DSP(Digital Signal Processor) filter 401 for passing the tracking error signal occurred in a regular writing/reading, a first TZC generating part 402 for generating the tracking zero cross signal turned on/off at a zero cross time point of the tracking error signal, a TE differential signal generating part 403 for differentiating the tracking error signal upon reception of the one track jump command, a second TZC generating part 404 for generating the tracking zero cross signal turned on/off at a zero cross time point of the differentiated tracking error signal, and a TAO controller 405 for controlling a driving voltage TAO of a tracking actuator with reference to the first and second TZC signals. FIGS. 11A~11F illustrate timing diagrams showing the one track jump process when the present track is a groove, and when the present track is a land, the one track jump is made in a state the signals are inverted from the signals in FIG. 11 except the track driving voltage. In FIG. 10 having the foregoing system, the optical pickup 102 directs a beam focused onto the object lens onto a signal track of the optical disk 101, or directs a beam, reflected at a signal recording surface and incident thereto, to the optical detector for detection of the focus error signal and the tracking error signal after focusing the beam onto the object lens again. As shown in FIG. 2, the optical detector has a plurality of optical detecting elements, for forwarding an electrical signal proportional to quantities of lights obtained at the optical detecting elements to the RF and servo error generator 103. The RF and servo error generator 103 detects the RF signal for reading the data, the focus error signal FE and the tracking error signal TE for servo control, and the like, from the electrical signal from the optical detector. If it is a regular writing/reading process, the tracking error signal generated at the RF and servo error generator 103 is converted into the track driving voltage TAO through the DSP filter 401, provided to the F/T servo driver 114, and a regular writing/reading is carried out, when the tracking servo is in a turned on state.

Figure 9:
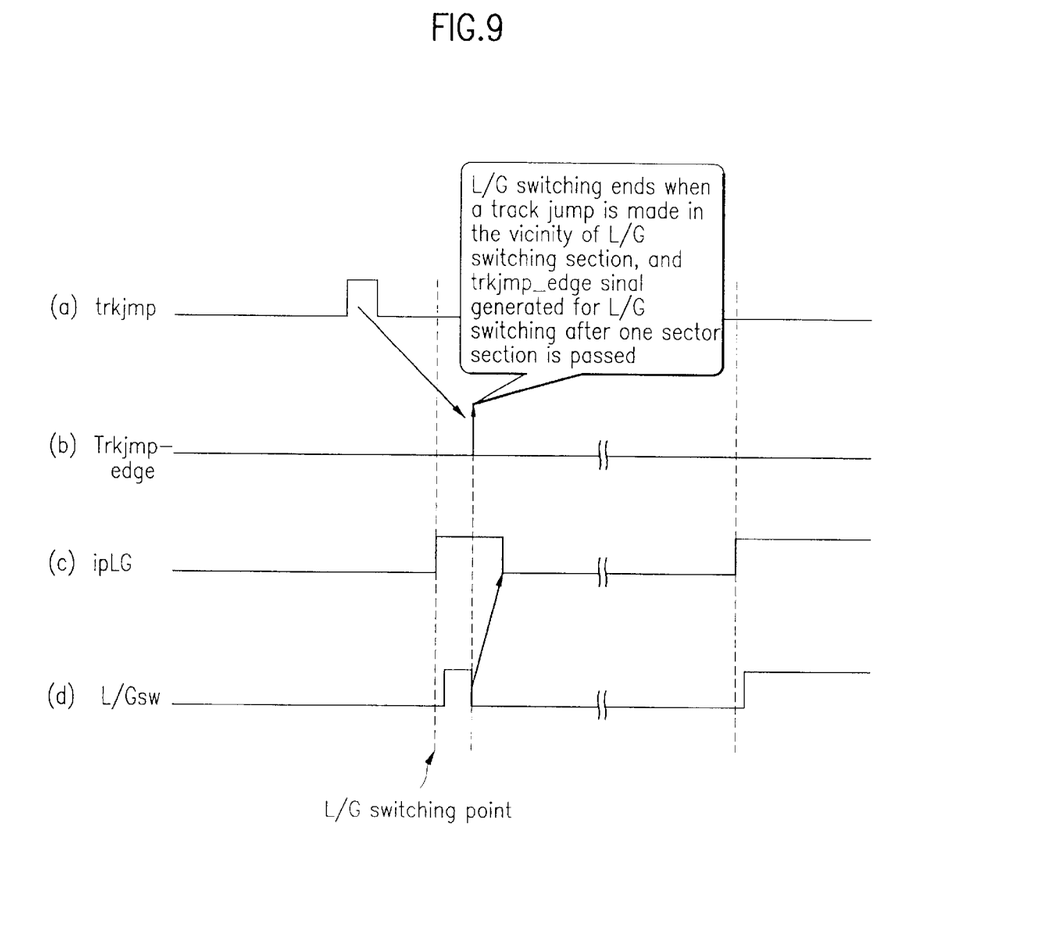
FIGS. 9A~9D illustrate timing diagrams showing relations of trkjmp, trkkmp_edge, ipLG, and L/Gsw signals for land/groove switching when a track jump command is produced in the vicinity of a land/groove switching section in FIG. 6.

In the meantime, if the one track jump command is received, the servo controller 113 generates kick pulses (or called as jump pulses) in a state only the focus servo is turned on, and provides the track driving voltage TAO proportional to the kick pulses to the tracking actuator through the tracking F/T servo driver 114. That is, when the kick pulses are provided, the object lens of the tracking actuator is pushed toward a track jump direction by an acceleration as a speed of the tracking actuator rises. In this instance, the first TZC generating part 402 generates the signal to be turned on/off at a zero cross time point of the tracking error signal TE, and, as shown in FIG. 11B, the generated TZC signal rises at a zero cross position of the tracking error signal TE. In the meantime, the TE differential signal generating part 404 differentiates the tracking error signal as shown in FIG. 11A generated upon reception of the one track jump command into a signal as shown in FIG. 11C, and forwards to the second TZC generating part 405. The second TZC generating part 405 generates a DTZC (Differential TZC signal) to be turned on/off at a zero cross time point of the differentiated tracking error signal DTE. That is, the DTZC signal rises at a zero cross of the DTE(Differentiated Tracking Error signal) as shown in FIG. 11D. In this instance, for conducting the one track jump, a generating time point of the brake pulses and a brake time point should be fixed after the kick pulses are received, which is carried out at the TAO controller 403. As one embodiment in a disk like the DVD-RAM, the TAO controller 403 generates the brake pulses to start the braking operation at or after a rising time point of the DTZC as shown in FIG. 11E in the case of the one track jump. That is, when the track driving voltage TAO proportional to the brake pulses is provided to the tracking actuator as shown in FIG. 11E, speed of the tracking actuator being accelerated by the kick pulses is dropped. Then, when a preset brake time comes, the tracking servo and the sled servo are turned on, and, in the present invention, the brake time is set until a rising time point of the TZC signal produced from the tracking error signal before the differentiation as shown in FIG. 11B. That is, as shown in FIGS. 11E and 11F, by switching the lang/groove, and turning on the tracking servo and the sled servo at a rising time point of the TZC signal, the one track jump is completed. The process until now is a case when the present invention is applied to a disk data can be written/read both on/from land/groove, and, if the data can be written/read only on/from land or groove, identical to the related art, the TZC signal generated at the first TZC generating part 402 is used as a control signal of the one track jump. In the meantime, in a case when the track jump command is generated in the vicinity of an L/G switching section, as the section is an L/G switching section from the starting, a forced switching of the L/G switching signal L/Gsw in addition to the original L/G switching may cause wrong tracking. The L/G switching section can be known by counting a number of headers. In this case, therefore, switching of the L/G switching signal L/Gsw is waited until an end of the L/G switching section, and if once the switching of the L/G switching signal L/Gsw is occurred, the L/G switching signal L/Gsw is forcibly switched in the next header section. In this instance, the vicinity of the L/G switching section may be set from a header position right before the L/G switching section to the L/G switching section, for example, may be set from a header position 2~3 sectors right before the L/G switching section. That is, if it is determined in the step 302 that the 'N'('N' is an odd number) track jump command is received in the vicinity of the L/G switching section, the microcomputer 116 provides the trkjmp signal to the track jump edge detector 202 as shown in FIG.10A. (step 308). However, the track jump edge detector 202 provides no trkjmp_edge signal until the end of L/G switching (step 309). That is, the previous state is maintained. In this instance, as phases of the IP1, IP2 signals are switched once the L/G switching section is passed, the L/G determining part 201 switches the ipLG signal into a high state as shown in FIG. 9C. (Step 310). Determining that the L/G is switched once the ipLG signal is switched, the L/G switching signal generator switches the L/G switching signal L/Gsw to a high state as shown in FIG. 9D. (Step 311). In the meantime, when the L/G switching section ends and one sector section passes, the track jump edge detector 202 generates trk_edge signal as shown in FIG. 9B and forwards to the L/G switching signal generator 203. (step 312). Upon reception of the trkjmp_edge signal, the L/G switching signal generator 203 switches the L/G switching signal L/Gsw into a low state. (Step 313). When the L/G switching signal L/Gsw is switched into a low state, the servo controller 113 carries out an 'N' track jump (step 314), and when the 'N' track jump is carried out, the L/G determining part 201 switches the ipLG signal into a low state as shown in FIG. 9C. (Step 315). Therefore, even if the track jump command is generated in the vicinity of the L/G switching section, the focus and tracking servos can be placed on a desired track safely after the track jump. Thus, the present invention permits that the focus and tracking servos can be placed on a desired track even after a track jump, by making a forced switching of the L/G switching signal L/G sw before carrying out the track jump when an odd number track jump is required.

As has been explained, by making a forced switching of the L/G switching signal L/G sw before carrying out the track jump when an odd number track jump is required, the method for controlling track jump in an optical recording medium of the present invention can make the focus and tracking servos to follow a desired track. Particularly, when the odd number track jump command is received in the vicinity of the L/G switching section, pass of the L/G switching section is waited, and, if a preset time period is passed after the L/G switching section is passed, the L/G switching signal is forcibly switched again before carrying out the track jump, the focus and the tracking servos can be made to follow a desired track safely after the track jumping.

And, upon reception of one track jump command in the case of an optical disk data writing/reading both on land/groove is allowed, such as DVD-RAM, the one track jump can be carried out, by differentiating a tracking error signal detected at this time, detecting a TZC signal from the differentiated tracking error signal, generating brake pulses at a rising time point of the differentiated TZC signal, and turning on the tracking servo and the sled servo while carrying out land/groove switching at a rising time point of the TZC signal detected from the tracking error signal before the differentiation.

It will be apparent to those skilled in the art that various modifications and variations can be made in the method for controlling track jump in an optical recording medium of the present invention without departing from the spirit or scope of the invention. Thus, it is intended that the present invention cover the modifications and variations of this invention provided they come within the scope of the appended claims and their equivalents.

What is claimed is:

1. A method for controlling track jump in an optical recording medium for writing/reading data on/from land/groove tracks having depths different from each other in a direction of a beam incident, comprising the steps of:
   (1) adjusting an offset of a servo error signal generated by using an optical signal reflected at the optical recording medium consistent to the land track;
   (2) adjusting an offset of a servo error signal generated by using an optical signal reflected at the optical recording medium consistent to the groove track;
   (3) selecting the servo error signal having the offset adjusted consistent to the land/groove track in the step (1) or (2) in response to a land/groove switching signal;
   (4) receiving a track jump command, and determining the track jump command of being an 'N'('N' is an odd numeral) track jump command; and,
   (5) if the track jump command is determined of being an 'N'('N' is an odd numeral) track jump command in the step (4), after switching the land/groove switching signal and carrying out an 'N' track jump, carrying out servo by using a servo error signal selected in response to the land/groove switching signal in the step (3).

2. A method as claimed in claim 1, wherein, when the 'N'('N' is an odd numeral) track jump command is received in the vicinity of a land/groove switching section, switching of the land/groove is waited, and if switching of the land/groove switching signal is made by the land/groove switching, the 'N' track jump is carried out after the land/groove switching signal is switched again.

3. A method as claimed in claim 2, wherein the land/groove switching section is detected by counting a number of pre-formatted headers between writeable data regions for marking the data regions.

4. A method as claimed in claim 3, wherein the vicinity of the land/groove switching section is set from a header position right before the land/groove switching section to the land/groove switching section.

5. A method as claimed in claim 1, wherein the land/groove switching signal keeps a state the same as before if the number of tracks to be jumped is an even numeral.

6. A method as claimed in claim 1, wherein, if one track jump command is received, the step (5) includes the steps of;
   (5-1) differentiating the tracking error signal generated when the one track jump command is received, and detecting a tracking zero cross signal from the differentiated tracking error signal, and
   (5-2) carrying out one track jump by using the tracking zero cross signal as a control signal for the one track jump.

7. A method as claimed in claim 6, wherein the step (5-2) includes the steps of;
   accelerating a tracking actuator by means of kick pulses generated in response to the track jump command, and
   providing brake pulses at a rising time point of the tracking zero cross signal detected from the differentiated tracking error signal, for decelerating the tracking actuator.

8. A method as claimed in claim 7, wherein the step (5-2) includes the step of switching the land/groove switching signal at the rising time point of the tracking zero cross signal detected from the non-differentiated tracking error signal after the brake pulses are generated.

9. A method as claimed in claim 7, wherein the step (5-2) includes the step of turning on a tracking servo and a sled servo at the rising time point of the tracking zero cross signal detected from the non-differentiated tracking error signal after the brake pulses are generated.

10. A method for controlling track jump in an optical recording medium for writing/reading data on/from land/groove tracks having depths different from each other in a direction of a beam incident, comprising the steps of:
    (1) adjusting an offset of a servo error signal generated by using an optical signal reflected at the optical recording medium consistent to the land track;
    (2) adjusting an offset of a servo error signal generated by using an optical signal reflected at the optical recording medium consistent to the groove track;
    (3) selecting the servo error signal having the offset adjusted consistent to the land/groove track in the step (1) or (2) in response to a land/groove switching signal;
    (4) receiving a track jump command, and determining the track jump command of being an 'N'('N' is an odd numeral) track jump command;
    (5) if the track jump command is determined of being an 'N'('N' is an odd numeral) track jump command in the step (4), determining that whether the 'N' track jump command is generated in the vicinity of the land/groove switching section or not;
    (6) if it is determined that the 'N' track jump command is not generated in the vicinity of the land/groove switching section in the step (5), switching the land/groove switching signal, carrying out the 'N' track jump, and operating a servo in response to the servo error signal selected according to the land/groove switching signal in the step (3); and,
    (7) if it is determined that the 'N' track jump command is generated in the vicinity of the land/groove switching section in the step (5), waiting for the lang/groove switching, and, once the land/groove switching signal is switched by the land/groove switching, switching the land/groove switching signal again, carrying out the 'N' track jump, and operating a servo in response to the servo error signal selected according to the switched land/groove switching signal.

11. A method as claimed in claim 10, wherein the land/groove switching section is detected by counting a number of pre-formatted headers between writeable data regions for marking the data regions.

12. A method as claimed in claim 10, wherein the vicinity of the land/groove switching section is set from a header location right forward of the land/groove switching section to the land/groove switching section.

13. A method for controlling track jump in an optical recording medium for writing/reading data on/from land/groove tracks having depths different from each other in a direction of a beam incident, comprising the steps of:

(1) adjusting an offset of a servo error signal generated by using an optical signal reflected at the optical recording medium consistent to the land track;

(2) adjusting an offset of a servo error signal generated by using an optical signal reflected at the optical recording medium consistent to the groove track;

(3) upon reception of a track jump command, determining the track jump command of being one track jump command;

(4) if it is determined in the step (3) that the track jump command is one track jump command, differentiating a tracking error signal generated in this instance, and detecting a tracking zero cross signal from the differentiated tracking error signal;

(5) carrying out one track jump by using the tracking zero cross signal detected from the differentiated tracking error signal as a reference of a brake pulse generating time point; and, (6) once the one track jump is carried out in the step (5), operating a servo in response to the servo error signal having an offset adjusted to be consistent to a land track or the servo error signal having an offset adjusted to be consistent to a groove track in response to the land/groove switching signal.

14. A method as claimed in claim 13, wherein the step (5) includes the steps of, accelerating a tracking actuator by means of kick pulses generated in response to the track jump command, and providing brake pulses at a rising time point of the tracking zero cross signal detected from the differentiated tracking error signal, for decelerating the tracking actuator.

15. A method as claimed in claim 14, wherein the step (5) includes the step of switching the land/groove switching signal at the rising time point of the tracking zero cross signal detected from the non-differentiated tracking error signal after the brake pulses are generated.

16. A method as claimed in claim 14, wherein the step (5) includes the step of turning on a tracking servo and a sled servo at the rising time point of the tracking zero cross signal detected from the non-differentiated tracking error signal after the brake pulses are generated.

\* \* \* \* \*